Aug. 28, 1962  D. K. WARNER  3,051,148
TWO CYCLE-RADIAL, HIGH-SUPERCHARGE ENGINES
Filed May 31, 1955  2 Sheets-Sheet 1

INVENTOR
Douglas K. Warner

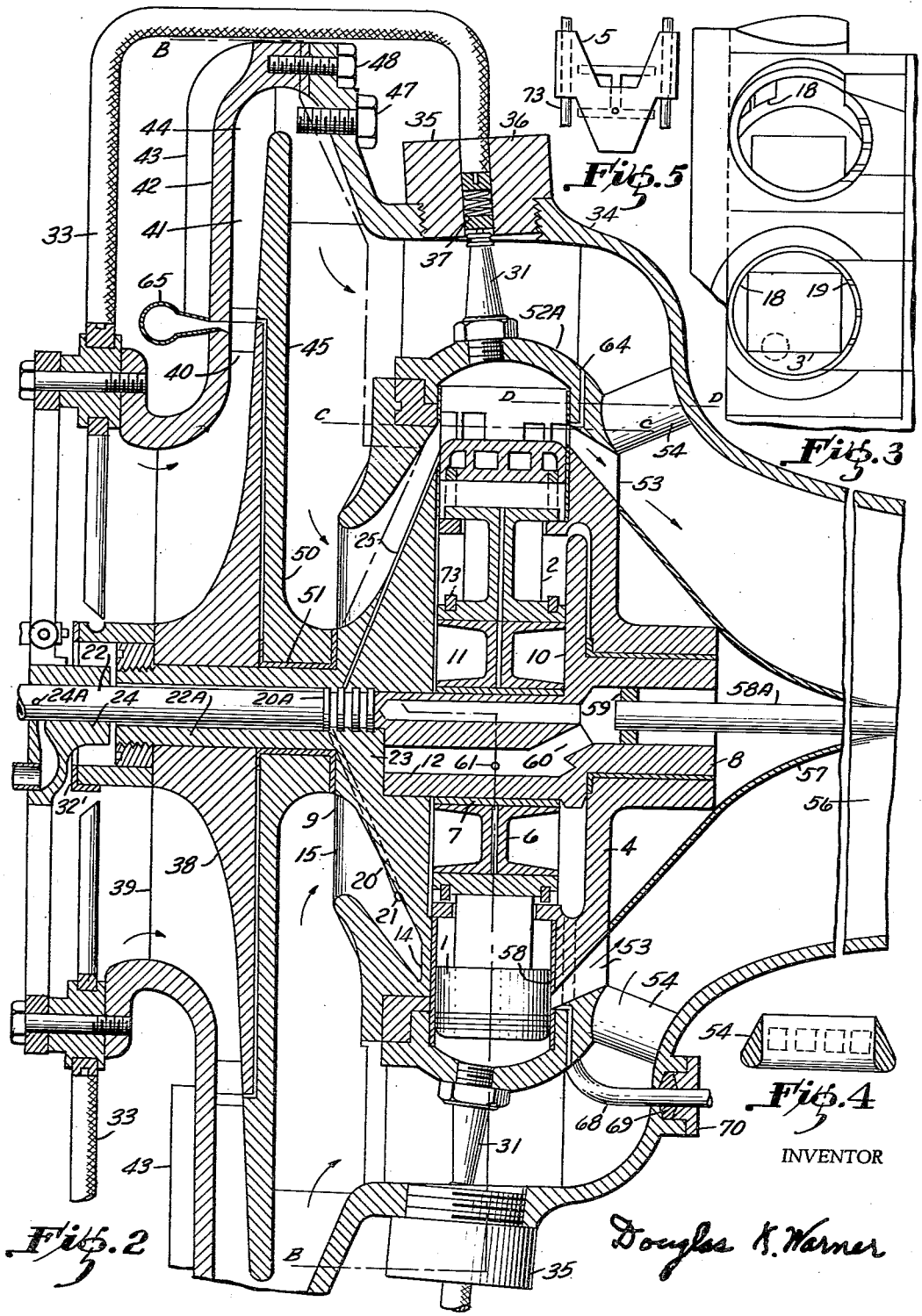

3,051,148
TWO CYCLE-RADIAL, HIGH-SUPERCHARGE ENGINES
Douglas K. Warner, 1937 Panama Drive, Sarasota, Fla.
Filed May 31, 1955, Ser. No. 512,228
16 Claims. (Cl. 123—55)

This invention relates to a 2 cycle engine of about ⅓ the normal stroke-bore ratio such as shown in my Patents 2,377,833, 2,310,471, 2,454,852 and 2,639,697 and to means for utilizing the exhaust blowdown or initial supersonic gas flow to further compress and heat air compressed with all the engine power output by a fan or series of fans mounted on the crankshaft.

In Patent 2,639,697 the exhaust was used to suck air over the cooling fins of each cylinder separately with intermittent blasts whereas here all jets act in unison in a small diameter common jet ejector-compressor to give continuous air and gas flow over all the cylinder head fins. Unlike a 4 cycle engine which must have an odd number of cylinders and a very complicated mechanism to achieve relatively poor balance, a 2 cycle engine with an even number of cylinders, without the troublesome master rod of the other engine, can be perfectly balanced easily. Since the exhaust ports of a 10 or 12 cylinder engine stay open over 100° of rotation, 4 of the cylinders are exhausting at all times creating a high velocity entrainment flow in the centrally located entrainment pipe or jet compressor thus further compressing the air from the engine's compressor after passage over its cylinder head cooling fins.

The engine described herein serves only to compress and heat air but is adapted to auto propulsion by conducting that heated air in light flexible tubes, not shown, to tiny geared turbines in the hubs of all wheels, not shown, thus replacing conventional transmission gears, drive shafts, universal joints, differential gears and axles which are hundreds of times heavier and put unsprung weight and high wear on tires. It gives great power in a tiny unit because—

(1) A rotary inlet valve permits complete cylinder blowdown to inlet pressures before inlet ports are opened so preventing the usual backflow thru inlet ports which must otherwise be reversed in the one thousandth of a second that ports are open, and so leaves no time to scavenge.

(2) Inlet ports have 3 times the usual relative height and the new charge and initial air and water scavenge are moving at sonic speed as ports suddenly open full height.

(3) The water enters ports at extreme speed with insignificant volume, changing to steam as it hits and cools hot surfaces and with the air follows the burnt charge straight across the cylinder and out the exhaust ports without the mixing with burnt gas of loop scavenge, essential where gas from a low inlet port must be made to sweep across a cylinder and up to its top and across and down the inlet side and back thru the incoming gas in loop type scavenge which completely mixes new and burnt gases before leaving exhaust ports.

(4) The fuel is sprayed in too late for any to get out the exhaust ports.

(5) Cool air compressing is too fast to absorb heat from carbon on walls which has just been cooled by water evaporation. Such conventional cooling of carbon deposit by heat transfer thru metal walls is extremely slow compared with water evaporation on the carbon itself.

(6) High compression is possible because of low temperature and because there is not time to knock at 30,000 r.p.m.

(7) Removing residual gases permits a cooler, heavier and more powerful new charge.

(8) Less power is required to compress more new charge when not mixed with hot residual.

(9) Fuel nozzles are shut off as required by a sliding motion of a fuel pipe sliding past grooves in crankshaft bore connected with said nozzles.

(10) There is no loss in efficiency due to throttling which causes enormous loss in all conventional auto engines which are throttled over 99% of the time.

(11) Power is reduced by supplying fuel to the air in fewer parts of the cylinder and while idling, fuel is directed only near the spark plug location and there is not time for it to spread out and become too thin a mixture to support combustion and as the engine slows down due to the much weaker explosion the fuel flow slows since its pressure is proportional to the square of the r.p.m. due to centrifugal forces at nozzles.

(12) Supercharge is also proportional to the square of the r.p.m. as is also the scavenge flow differential pressure which is still further increased due to increasing pressure drop in air flow across the cylinder head fins while the rotary valve fan pressure is increasing with the square of the r.p.m.

(13) Since all the reciprocating parts weigh only one pound, acceleration is extremely rapid when all, instead of 20%, of the air in the cylinder gets a rich fuel charge. A stoichiometric mixture, or even more so a 15% fuel rich mixture, obtained by admitting fuel to all the nozzles in the rotary valve fan passages, enormously increases the M.E.P. so that with its very light engine parts the engine can in 2 seconds change from 300 r.p.m. to 24,000 r.p.m. This instant change in speed coupled with the extreme increase in explosion pressures gives an unusual change in power making it possible to idle an engine using negligible fuel into auto traffic delays but when the lights change to green accelerate the car as much as the tires on 4 drive wheels permit. In conventional car engines the throttle reduces the mass of air drawn into a cylinder and requires much power to draw the piston down on the suction stroke but instead of a throttle restriction in this engine the fuel is thrown into the cylinders thru only the smallest of several nozzles and it does not have the usual pumping loss incurred in pulling pistons down against atmospheric pressure with ½ an atmosphere above the piston, but gets its decreased torque because of very weak explosions.

(14) The high power of this tiny engine is further increased since the usually wasted exhaust energy of its exhaust port expansion nozzles entrains the compressed air which has been blown over the cylinder head fins and further compresses and heats that air in the common jet compressor.

In the accompanying drawings:

FIG. 2 is a section in a plane perpendicular to FIG. 1 along AA, FIG. 1.

FIG. 3 is a section at CC, FIG. 2 thru cylinder inlet and exhaust ports.

FIG. 4 is a rear view of exhaust ports with casing supports 54 sectioned at DD, FIG. 2.

FIG. 5 is a view of the contact surface of the big end of a connecting rod.

Figure 1:
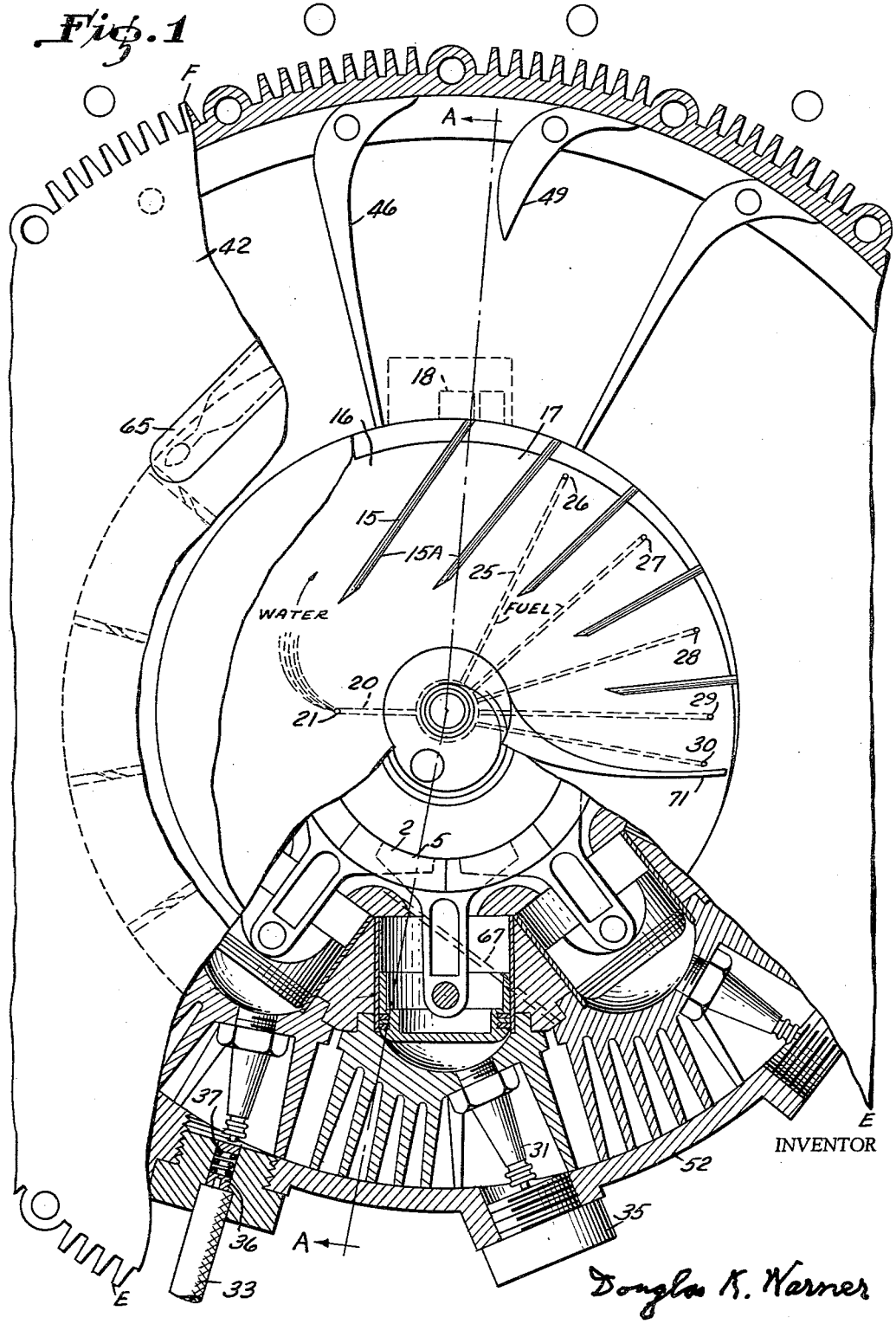
FIG. 1 is a section of the engine along the line BB of FIG. 2 in a plane perpendicular to the crank shaft.

In FIGS. 1 and 2, pistons 1 are shown acting on connecting rods 2 which are inserted into said pistons by pushing them thru the crankcase 4 and the rectangular holes 3 therein.

The shoe portions 5 of the connecting rods 2 interlock with each other as shown in FIG. 5 so that each may cover a longer arc on the outer surface of the stiff bushing 6 which is prevented from bending under extreme explosion loads by having interconnected inner and outer flanges formed in the shape of an I-beam bent around the inner crank-pin bushing 7. The latter turns freely on inner and outer surfaces probably turning at half the crankpin r.p.m. when excessive speed increases the friction coefficient on one surface. The outer bushing 6 is so stiff that the explosion loads cannot bend it so that a large part of the explosion force is transferred thru this beam around the crankpin to balance the inertia forces of the pistons at bottom stroke on the opposite side which normally bend a thin bushing and place all their load on the crankpin, resulting in 5 times the friction on the crankpin when inertia force at bottom stroke is ⅔ the explosion force. The inner bushing 7 is plated and treated in the usual manner of high speed supercharger bushings, outside and inside.

The outer surface speed of the outer bushing normally is that of the rod's 2 big end lateral motion at top dead center when the explosion pressure makes it stick to the bushing surface but since the rod is about half as long as the distance between crankpin and wristpins centers the crossover speed is proportionately less than in conventional design and the area of the big end is also greater. This greater area is essential where ten or more rods must bear directly on a free turning bushing. It is impossible to balance an engine having the conventional master rods used in 4 cycle engines with an odd number of cylinders but perfect balance can be had with an even number here. The large diameter stiff outer bushing thus serves the triple purpose of providing necessary bearing area, and of diminishing crankpin bearing loads and of eliminating vibrations. The surface speed on the lightly loaded side of bushing 6 is twice average speed.

The stroke of this engine is so short that the crankshaft is easily forged and machined in two pieces 8 and 9 and shrunk together after assembly of bushings and rods on the crankpin 11 of part 8 turning in crankcase 4. Part 9 which forms the fore part of the crankshaft, being shrunk on crankpin extensions 12 and 13 comprises a high strength steel disk as well as a bored out front shaft, said disk reaching out to all inlet ports 18 and closing same over ¾ of its perimeter while housing fan blades with air passages discharging into said ports thru ¼ its perimeter. This rear part 8 also carries a light counterweight 10 to balance half the weight of crankpin 11 and ¼ the weight of the pistons and rods. The large diameter of the crankcase permits a counterweight radius several times that of crank throw which permits a lighter weight thereof and also serves to throw oil at high speed into groove 66 and tangentially drilled hole 67 below 10 at such speed as to evacuate the crankcase with the oil-drop pistons thrown from the counterweight into hole 67 and pipe 68 en route to a filter and cooler, not shown, to be returned after releasing gases, when it enters the crankshaft bore in pipe 58 and the bushing 59 shrunk within the bore of rear shaft 8.

Crankpin extensions 12 and 13, the latter being concentric with shaft 8, form the balance of the rear part of the crankshaft. These extensions are shrunk fit into part 9 and since they have centers a crank throw apart there can never be any twisting between the two parts. The rotary valve 14 and its open fan portion 15 are forged as part of 9 which includes the front end of the crankshaft.

The first passage 16 of rotary valve fan 15 is highly backswept and stable enough to continue gas flow if blowdown is not entirely complete. It starts to open to each cylinder 15° to 30° before bottom center and with passage 17 creates a full flow thru inlet ports 18 while they are wide open, about half the height of the cylinder, remaining open for supercharge from the forward curved final fan blade 71 after exhaust ports 19 have been closed by pistons 1. This extra supercharge with exhaust ports closed and piston rapidly rising is possible because of the higher pressure from forwardly curved blades and the longer diffuser formed with piston and cylinder wall at that time. It takes about 27° of revolution of the rotary valve to fully open both inlet ports in a 10 cylinder engine or 23° in a 12 cylinder engine when leaving 9° and 7° intervals of closure between cylinder's entrance diffusers 18A. While passing from cylinder to cylinder the rotary valve fan 15 maintains a continuous flow replacing the previous intermittent and reversing flow in 2 cycle ported engines where inlet ports are lower than exhaust ports and where there is no rotary value to prevent the high pressure cylinder gases, still unable to exit thru the slightly opened exhaust ports, from starting in reverse flow thru the inlet ports. The low inlet ports not only retard the flow of gases but necessitate inefficient loop scavenge to reach the top of the cylinder which mixes the new charge completely with the hot burnt gases thus weakening explosions and requiring more power for compression.

Because the passages to inlet ports are separated by a 7° arc metal which closely adjoins the curved rim of the rotary valve of the 30° allotted each cylinder in a 12 cylinder engine or 9° in a ten cylinder engine flow from a single passage in the fan can move continuously to two cylinders at a time without stopping or materially retarding that essential high velocity flow which permits maximum torque at speeds far above 3,000 ft. per minute while torque in all other engines is greatly reduced because a full charge cannot be entered into the cylinder even if rings held to the walls. However, the inlet ports are then open as wide as 85° crank rotation of piston travel before bottom center would open them, and in the meantime the high pressure in the cylinder has been reduced by blowdown out of the exhaust ports 19 where the 3,000° temperature permits more than twice the gas velocity of sonic speed thru the inlet ports due to the exhaust's more than 4 fold higher temperature.

To attain near sonic gas velocities the flow from the inlet fan blades must enter cylinder ports nearly in line with the gas motion leaving the blades so only two ports are used, forwardly disposed relative to fan motion, with the center line of the cylinder parallel with the crankshaft, while two ports, 19, on each side of that center line send the faster exhaust gases directly rearwardly into the central exhaust pipe 56 entraining the bypassed air en route at 53, but with no change in direction.

The exhaust velocity after blowdown and during scavenge is maintained high due to the pressure caused by the fan blades in the rotary valve and due to the lower pressure behind the cylinder caused by air friction as it cools the cylinder head fins 52. This straight line gas flow with extreme pressure differential for the longer time these highed and so larger exhaust and inlet ports are open permits complete scavenge flow in much shorter time than is possible with loop and other types of scavenge which mix new but burnt gas instead of passing straight across, and which turns sharp corners and have small pressure forces. The result is much higher explosion pressure far more often.

The two stage supercharge permits high efficiency with low cylinder compression ratio and relatively large clearance volume and resulting cylinder volume and since all the space above the piston is completely scavenged by this pipe line type of flow the larger volume results in more power and higher exhaust jet velocities and mass during blowdown and more power in the gases in pipe 56. If this tremendous exhaust energy were not usefully employed it would not be practical to have the large clearance volume and great power, due thereto because of the limited expansion ratio within the cylinders which lowers efficiency in cycles not utilizing exhaust energy.

The valve-fan shown in FIG. 1 has 6 air passages. The first two, 16 and 17, handle air only except at peak load when water to cool the carbon coating of cylinder head and piston top is added. From nozzle 21, ahead of blades 15A, in fan 15, water is sprayed from nozzle 21 at end of passage 20 which is drilled in part 9 to groove 22A in the bore thereof having run along the lower interior of pipe 22 when said pipe has been pulled to its outward extremity by conventional throttle connections not shown so as to communicate said interior thru hole 24A with a water supply not shown. This groove is the outermost of a series of grooves 23 connecting with fuel nozzles 26, 27, 28, 29 and 30. Pipe 20 slides thru the fixed water connection 24 comprising a sleeve which at all times encloses a hole 24A in pipe 20 and which communicates said hole with a water supply not shown permitting water to flow below fuel in 20 when 20 is pulled all the way out to the last groove 29A. The water flowing along the bottom of pipe 20 will drop into the first groove whence it is sprayed from nozzle 21 to mix with the air in passage 16. This water and air without fuel enter the cylinders first, and the water is evaporated by the white hot carbon coated surface, cooling the latter, and the steam thus formed moves with the initial air out the exhaust ports behind the burnt gases with which they have partially intermingled. The hole in water connection 24 aligns with a similar hole in fuel pipe 20 only when 20 is pulled out its limit. Then the water will flow into pipe 20 and being heavier than oil will flow along the bottom of pipe 20 and will fall into the first groove of those connecting with fuel nozzles 26 and 30 while the upper fuel will move on to the other grooves near the plane of the cylinders.

With pipe 20 moved inwardly slightly the water will be shut off as will be the fuel oil to connecting hole 25 and nozzle 26 while fuel still flows from the remaining nozzles 27, 28, 29 and 30. Nozzle 30 in the now thicker rim of 15 is directed at spark plug 31 to place a small amount of fuel close to the plug one four thousandth of a second before it fires and before that fuel has time to spread out in the rest of the clearance volume and become too weak to ignite. The other nozzles are connected with the fuel supply as required by depressing the conventional throttle pedal, not shown, which moves the fuel pipe 20, or by any other conventional control mechanism. The other fuel nozzles are each directed to a different cylinder location each in turn further away from the spark plug so that the flame may travel quickly to all parts of the cylinder when all nozzles are supplying the air with a stoichiometric fuel ratio or richer mixture.

Only by spraying a small amount of fuel directly around the spark plug when the piston is half way up on the compression stroke, and by completely scavenging the burnt gases to leave only air is it possible to slowly and evenly idle a 2 cycle engine and use less than 1% the idling fuel of a gas turbine of equal maximum power.

Unlike throttled 4 cycle engines there can be no wasteful pumping of air at less than half an atmosphere out against atmospheric pressure, nor does this two cycle engine throttle the inlet so that only occasionally is there enough burnable fuel-air mix near the spark plug to make it fire irregularly. An 8 cylinder 4 cycle engine at 2500 r.p.m. fires 10,000 times a minute while a similar piston speed in this engine having ⅙ the usual stroke and 10 cylinders has the smooth performance resulting from 150,000 explosions per minute, or at idling sped 150 explosions per minute, each with exactly the same fuel mixture as the others since each cylinder is supplied with the same nozzle, always only ¼" distant and with no variation from other cylinders of inlet passages.

Distributor 32 mounted on the front end of shaft 9 distributes a continuous spark to each cylinder in turn thru wires 33 and plug contactor 35 which is screwed in casing 34, said contactor 35 being dielectric with central metallic core 36 gripping the end of wire 33 and holding sprungpiston 37 against the metal end of spark plug 31. Removal of contacter 35 permits sliding a socket wrench over plug 31 to remove same without removing casing 34.

Rearward of distributer 32 on shaft 9 is mounted compressor 38 having blades 39 slotted at 40 to prevent back and uneven flow behind blades and sonic disturbances in diffuser 41 as shown in my Patent 2,819,838. The compressor casing 42 has fins 43 to cool air during compression and interior vanes 44 to properly guide the air flow.

Casing 42 extends over the inner wall 45 of diffuser 41, and flow directors 46 on the rear side of 45 are drilled and tapped for bolts 47 which hold casing 34 to wall 45 where, centrally disposed, is bushing 51 mounting crankshaft portion 9. An outer circle of bolts 48 fastens the outer wall of compressor-diffuser casing 42 to casing 34. While directors 46 extend inwardly as far as bearing hub 50, short directors 49 interspersed between 46 and also forming part of 45 are likewise drilled and tapped for additional bolts 47 wherein their streamlined form they, 49, have a maximum thickness.

Air leaving diffuser portion 41 reverses and passes inwardly behind wall 45 and most of it passes between cylinder head fins 52 and thence to exhaust jet ejectors 53. When used in an auto the output of this 10 jet ejector compressor is carried in flexible pipes to tiny gas turbines and reduction gears, as shown in my Patent 2,699,643, in the hubs of all wheels.

Casing 34 slides over cylinder head fins 52 holding the heads 52A against the crankcase 4. Cylinder linings 58 are shrunk into heads 52A and also fit to slide into crankcase 4 after assembly of pistons and rods and shrinking together the two halves of the crankshaft.

Cone 57 butts against crankcase 4 within the terminus of jets 53 and serves to direct the jets into compressor tube 56 and cone 57 has its apex around oil pipe 58A. Cooled oil entering the engine thru pipe 58A is thrown outwardly in crankpin hole 60 and then thru hole 61 which connects with any of the continuous series of holes in bushings 6 and 7 and the matching hole in rod 2 to wrist pins 62. The top surface of the pins 62 bear directly in the inverted troughs milled in the pistons while rods bear on the opposite side of the pins and have two straps thru which the pins are pased during assembly. At about 40° before top dead center inertia forces exceed compression loads above the pistons and bearing surfaces separate far enough to permit heavy flow of oil for cooling urged on by high centrifugal pressures. The top surface of the pin freezes to the hot piston and the end of pins to the tight holes in piston walls, and oil is guided under straps and beneath all of the wrist pins. The oil which leaks out from wrist pins and bearings is eventually thrown by the pistons against counterweight 10 whence it is thrown radially from its sector circumference into the circumferential groove 66 whence at the lower portion thereof a drilled hole 67 carries the oil interspersed with air and gas at extreme velocity to an oil cooler not shown above the engine whence it returns thru shaft bore pipe 58, after removal of the gases which might be blown by the piston rings or the rear wall of the rotary valve.

Compressed air from diffuser 41 enters rotary valve fan 15 with water from from nozzle 21. This cooling of the inner side of the cylinder and the complete scavenge permit high compression and high power and since the explosion does most of the work of compression (which often takes 75% of the power in a turbine) the power in this engine is very high, but the exhaust temperature is so high that the piston ring guide bridges at the exhaust ports might melt if streams of air were not directed on them from holes 64 in cylinder heads 52A. Bridges have not the usual stresses. Liners do not touch at the bottom and so they lengthen freely when hot.

While it might be possible to extend the front end of the crankshaft to permit electric starting it is simpler to use compressed air jets 65 directed on the tips of the compressor blades in a tangential direction to give the needed very small starting torque. Compressed air may be replenished at any gas filling station or solid carbon dioxide bars may be slid in containers not shown and the covers sealed to provide high pressure gas jets for starting.

While pushing casing 34 over cylinder head fins 52 oil outlet pipe 68 must be entered thru hole 69 in casing 34 and seal with stuffing box nut 70 compressing packing 55. Because of the tip speed of the fan blades which approximates 900 ft./sec. when the pistons average speed is 50'/sec. constituting a leverage of 18 to 1 it may be useful to use jets of stored gas expanded from high pressures in nozzles 65 in fan casing side wall 42 laterally against the tips 40 of the fan blades of fan 38. A pressure container and starting valve not shown may remain permanently connected to said nozzles except when exchanging containers and if oxygen is used in said jets some of this will enter the cylinders and hasten the very quick starting.

I claim:

1. In a two-cycle short stroke engine having a single row of radially disposed cylinders having inlet and exhaust ports on opposite sides of said radial cylinders and cylinder heads having fins mounted thereon, and pistons alternately closing and opening said ports, a compressor fan mounted on said engine and receiving power therefrom and directing part of its output over said fins and part thru said cylinders, and expansion nozzles directly communicating with said exhaust ports directed inwardly rearwardly, and inwardly contracting passages communicating with air leaving said fins, and with gases leaving said nozzles, and a pipe communicating with said gases and said air, said pipe being concentric with said engine and of about 2 diameters in length, whereby within said pipe the supersonic hot exhaust gases entrain and further compress the air moving over said fins.

2. In the engine of claim 1 a crankshaft having a central hole in each end thereof and a lubricating oil pipe in one end and a slidable fuel oil pipe in the opposite end within said compressor, a rotary valve disk and a fan having several blades varying from highly sweptback to forward curvature, all said blades terminating in approximately in a ¼ sector of the periphery of said valve disk where said disk is thinner and of lesser diameter than other portions of said disk where that greater diameter and thickness close the openings to said inlet ports, whereby said inlet ports may be held closed during blowdown thru said exhaust ports, fuel holes in said fan communicating with said central hole and spray nozzles at the termination of said holes whereby fuel may be sprayed into said engine.

3. The engine of claim 1 and a circular rotary inlet valve adjacent said inlet ports and having a lesser radius and thinner section for about ¼ of its periphery and having fan blades on the forward face of said valve and having fan passage between said blades, both said blades and passages terminating in the disk sector of lessor radius, the first of said fan blades being straight having great back sweep and approximately parallel to said valve rim and each blade thereafter becoming more radially inclined while the last blade has a forward curvature whereby the pressure developed by said fan corresponds with the increase in pressure in said cylinders caused by a rising piston as a particular passage in the fan passes its inlet ports.

4. The engine of claim 1 having piston pins fixed in said piston and connecting rods hung to said pins front and rear and having wide interlocking big end shoe portions and a crankshaft central in said engine having an eccentric crank pin having a hole therein communicating with an oil supply fed thru said crankshaft and a hole in the surface of said pin forwardly of its top center position, a thin free low-friction bushing on said pin and holes therethru communicating with said pin hole and an I-beam shaped ring around said thin bushing stiff enough to transfer forces imposed by rods on opposite sides of said ring, bands around said rods holding them to said stiff bushing and holes in said rods communicating with the lower portion of said wrist pins and with the holes in said bushings whereby oil is forced out over all bearing surfaces under great pressure when inertia lessens the load of compression.

5. The engine of claim 1 in combination with a rotary inlet valve with vanes embodying several passages formed by said vanes in one sector thereof and a continuous closure rim adjacent said inlet ports elsewhere, several fuel nozzles in said fan passages, the last of said passages having a forward curvature and two fuel nozzles, one nozzle of very low capacity used for idling and one of high capacity for normal loads, additional fuel nozzles in adjacent passages for higher loads and means comprising a pipe drawn outwardly centrally within said compressor fan and valve fan communicating said nozzles with a fuel supply and the first two said passages having a highly back swept formation and no fuel nozzles therein whereby a wall of air without fuel is formed between burnt white hot gas being pushed across the cylinder and the new charge containing fuel sprayed into the fan passages which discharge into the cylinders later.

6. The engine of claim 1 in combination with a rotary inlet valve immediately adjacent all inlet ports in said engine and a sector of said valve openly communicating with said inlet ports, vanes in said sector forming fan passages each of varying degree of inclination from highly backswept to forward curvature, at least one fuel nozzle in the last of said passages communicating with a fuel supply, a water nozzle communicating with a water supply only at peak loads and then spraying water into the first of said passages whereby steam is formed in the cylinder with the initial scavenge air thereby widening the space between hot burnt gases and the new fuel air mixture and insuring that no fuel leaves the cylinders with scavenge air and steam.

7. The engine of claim 1 in combination with a rotary inlet valve having fan passages of varying degree of inclination from highly backswept to forward curvature said valve counterbalancing half the unbalanced forces of the rotating and reciprocating parts, and an eccentric crankpin and a thin counterbalance weight at the opposite end thereof from said rotary inlet valve counterbalancing the other half of said unbalanced forces, a crankcase containing said pin and weight and a groove in said casing closely adjoining the path of the outermost portion of said weight into which oil is thrown by said weight and a hole drilled in said case thru material between cylinders near the bottom of said engine and at a slope which brings it into communication with said groove near the bottom of the casing and nearly tangential to said groove whereby oil is thrown out after absorbing the heat of engine friction and piston cooling together with gases leaking into said casing.

8. The engine of claim 1 and a housing forward of said compressor forming also a forward and outer portion of a diffuser thereof and a second housing forming a rear portion of said diffuser and a front main bearing housing and a third housing formed to slide over said cylinder head fins said third housing having an outwardly extending flange bolted to said first two housings and also having an inwardly extended portion rearward of said fins from said first two housing projections extended forwardly from the inner portion between said cylinders and a crank case in said engine held between said projections and said second housing by the bolting of said flange, the space between said projections forming passages for air moving over said fins and communicating with the said exhaust jets of said cylinders, said third housing holding all outward explosion forces by compression in said fins so eliminating engine bolts.

9. The engine of claim 8, spark plugs at one side of said cylinder heads and in line with the direction of fuel and air flow through said cylinders and said third housing constructed with spark plug removal holes therein and thicker material in line with said spark plug holes whereby, without weakening its ability to hold the cylinder explosion forces, plugs may be removed, closure plugs screwed into said holes said closure plugs being of insulating material and containing spring means for assuring metallic contact from lead-in wires to plug tops and an oil pipe hole thru the rear of said 3rd housing whereby a lubricating oil feed line pipe may be passed thru said hole during assembly as said 3rd housing is being slid over said cylinder head fins to hold said cylinder heads against said crank case when the latter heats and expands forcing the heads and their fins against the cooler 3rd housing.

10. In a single row 2 cycle finned radial-cylinder engine having a crankcase with radially disposed cylinder housings therein and rectangular openings at the inner extremities of said housings having each dimension less than that of the diameter of said cylinder housings, finned cylinder heads on said engine's cylinders, connecting rods and retainer rings for encircling parts of all said rods, a rear shaft bushing, an inner, and outer stiff-bushing for crank pin encirclement, wrist pins and loops on connecting rods for attachment to said pins, and pin troughs in both pistons and rods, and holes in sides of pistons for inserting pins, a compressor fan on engine shaft and housings around said fan, a two-piece crankshaft with the rear portion thereof comprised of a rear shaft, counterweight-oil-and-air-pump and an offset crank pin with central projection and front portion comprised of a front shaft and an inlet rotary-valve disk and fan-blades, and fuel passages communicating with a central hole in said shaft and having a small central and larger offset hole at the rear thereof into which the crank pin with its central projection is forced while the latter is being cooled and the valve disk heated, and having a compressor fan splined to said front shaft delivering most of its output around cylinder head fins and thence inwardly to a pipe concentric with engine shafts, said engine cylinders having exhaust port expansion nozzles rearwardly centrally inclined in a manner to use the blowdown velocity energy continuously to entrain and further compress the air heated by said fins, the method of assembly comprising inserting a connecting rod retainer-ring in the crankcase, then inserting the rear-shaft bushing and shaft and in sliding rods along inner central side of crankpin and then moving them outwardly thru rectangular openings in crankcase below cylinder housings then pushing pistons inwardly to rods then inserting a second retainer ring over rods and moving rods outwardly so their grooves engage said rings, then slipping thin and I-beam bushings over crank pin and within rod big ends, then inserting piston pins thru holes in front wall of cylinder housings, connecting pistons and rods, then pressing cylinder barrels over pistons, then shrinking front valve-fan on crankpin, then sliding bushing and front bearing housing over front shaft, mounting cylinder heads over barrels and crankcase and forcing rear casing over cylinder head fins and bolting same casing to front bearing housing, then forcing fan over splined portion of front shaft and bolting its diffuser casing to rear casing.

11. The engine of claim 2 and a crankcase surrounding said crankcase having spaced and radially directed cylinder housings therein and said finned cylinder heads impinging directly on said housings, thin cylinder linings shrunk into said heads and inserted in said housing the inner edge of said linings being free to expand inwardly, inlet and exhaust ports in said cylinder's front and rear portions and narrow, ring-guiding bridges between said ports which, because of said freedom of cylinder expansion and the impingment of the heads on the housing remain free from compression stresses, and radially directed slots in said cylinder housings communicating with said cylinder liner inlet ports and in close proximity to said rotary valve disk and fan blades, and a crank pin forming the central part of said crankshaft of relatively small throw, and a large diameter, I-beam-shaped bushings on said crank pin and connecting rods having shoes bearing on said bushing and having wristpin ends outwardly thereupon, said rods being introduced into said crankcase at the forward end thereof prior to introduction of said bushing, said rods having said outer wrist pin ends pushed outwardly from said crankshaft-crankpin into said cylinder casings before assembly of heads and cylinder liners, whereby said pistons are inserted inwardly radially into said crankcase cylinder housings to communicate with said rod wrist pin ends, and wrist pins inserted thru said forwardly located slots in said cylinder housings, joining said rods and pistons whereby said cylinders (shrunk in said heads) may be inserted in said housings over said pistons to complete engine assembly.

12. In a radial reciprocating engine having cylinder heads and vertical fins thereon shrunk over cylinder liners and a crankcase adjacent said heads, and having an outer casing to slip over said fins, the method of retaining said heads by first assembling the engine and when cold of sliding the outer casing over said fins whereby when the crankcase heats it expands and forces a tight fit of casing on fins so holding the heads.

13. In a two cycle engine having a cylinder and a piston therein, intake and exhaust ports in said cylinder opened and closed by movement of said piston, means for introducing air under pressure into said cylinder, valve means for introducing the admission of air and fuel to said intake ports, said piston closing off said exhaust ports on the compression stroke before the intake ports are completely closed while said valve is open, said piston on the expansion stroke substantially uncovering the intake ports while said valve means keeps them closed and then uncovering the exhaust ports thereby initiating exhaust blowdown and thereafter opening said valve to admit air through the intake ports so that the burned gases are forced out through the exhaust ports and finally adding fuel to the incoming air when the piston again closes the exhaust ports thus permitting scavenge and cooling with air only, and adding fuel and air when it is too late for any fuel to escape by crossing the cylinder to said exhaust ports.

14. In the engine of claim 13 means for adding water to the initial incoming air.

15. In an engine having a cylinder and piston therein, intake and exhaust ports of lesser height than inlet in said cylinder opened and closed by movement of said piston, and having intake passage closure means immediately adjacent said intake ports closing said intake ports during approximately the last half of the compression stroke and most of the expansion stroke, the method of scavenging said engine comprising the step of holding the intake passage closed during blow-down until the pressure in said cylinder approximates inlet pressure and of then admitting air under pressure and at high velocity through and across said cylinder forcing burned gases ahead of it and in part following the burned gases out said cylinder together with the heat absorbed in said air from said cylinder and piston, and the step of forcing more air at higher pressure into said cylinder together with fuel when closure of said exhaust ports by said piston prevents escape of fuel therethrough and permits air supercharge higher than the pressure outside the cylinder beyond said exhaust ports.

16. The method of claim 15 and including the additional step of initially adding water to the scavenge air which follows the burned gases out the exhaust ports when loads are maximum requiring more cooling than air alone permits.

References Cited in the file of this patent

UNITED STATES PATENTS

| | | |
|---|---|---|
| 1,493,157 | Melot | May 6, 1924 |
| 2,283,175 | Berger | May 19, 1942 |
| 2,488,174 | Clegern | Nov. 15, 1949 |
| 2,533,487 | Maurer et al. | Dec. 12, 1950 |
| 2,583,651 | Horning | Jan. 29, 1952 |
| 2,639,697 | Warner | May 26, 1953 |
| 2,749,023 | Lewis | June 5, 1956 |
| 2,822,665 | Nicolin | Feb. 11, 1958 |

FOREIGN PATENTS

| | | |
|---|---|---|
| 994,004 | France | Aug. 3, 1951 |